(12) United States Patent
Nishioka et al.

(10) Patent No.: US 7,534,051 B2
(45) Date of Patent: May 19, 2009

(54) OPTICAL FIBER CONNECTOR, OPTICAL FIBER CONNECTING METHOD, AND CONNECTOR CONVERTER

(75) Inventors: Daizo Nishioka, Yokohama (JP);
Kenichiro Ohtsuka, Yokohama (JP);
Toshifumi Hosoya, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 60 days.

(21) Appl. No.: 11/783,607

(22) Filed: Apr. 10, 2007

(65) Prior Publication Data
US 2008/0013891 A1 Jan. 17, 2008

Related U.S. Application Data

(60) Provisional application No. 60/791,200, filed on Apr. 12, 2006.

(51) Int. Cl.
*G02B 6/36* (2006.01)
(52) U.S. Cl. .............................. 385/60; 385/56; 385/53; 385/76; 385/77; 385/78; 385/62; 385/81
(58) Field of Classification Search .................. 385/59, 385/60, 62, 66, 68, 70, 71, 72, 76, 78, 81, 385/87, 91, 92, 139, 53, 77, 95, 97, 98; 65/406.407
See application file for complete search history.

(56) References Cited

U.S. PATENT DOCUMENTS

| | | | |
|---|---|---|---|
| 4,629,284 A | 12/1986 | Malavieille | ............... 385/65 X |
| 5,129,024 A | 7/1992 | Honma | ........................ 385/76 |
| 5,245,683 A * | 9/1993 | Belenkiy et al. | .............. 385/72 |

(Continued)

FOREIGN PATENT DOCUMENTS

FR 2 464 490 3/1981

(Continued)

OTHER PUBLICATIONS

Japanese Office Action, with English Translation, issued in Japanese Patent Application No. JP 2003-358435, mailed on Apr. 1, 2008.

(Continued)

*Primary Examiner*—Brian M Healy
(74) *Attorney, Agent, or Firm*—McDermott Will & Emery LLP

(57) ABSTRACT

The present invention relates to a low-cost attachable/detachable optical fiber connector, and the like. The optical fiber connector comprises first and second fiber connecting members. The first fiber connecting members has a ferrule that holds a first optical fiber in its inserting hole in a slidable state, a housing that covers the first optical fiber, and a fixing member that fixes the inserted first optical fiber to the housing behind the ferrule so as not to protrude out from the ferrule. The second fiber connecting members has a housing that has a ferrule engaging portion having a recess therein and an optical fiber holding portion that holds a second optical fiber in its inserting hole in a slidable state, and a fixing member that fixes the inserted second optical fiber to the housing behind the optical fiber holding portion so as to protrude into the recess from the optical fiber holding portion.

14 Claims, 12 Drawing Sheets

U.S. PATENT DOCUMENTS

| | | | |
|---|---|---|---|
| 5,452,386 A * | 9/1995 | van Woesik | 385/72 |
| 5,748,821 A * | 5/1998 | Schempp et al. | 385/76 |
| 5,835,652 A * | 11/1998 | Yagi et al. | 385/87 |
| 5,984,532 A | 11/1999 | Tamaki et al. | 385/70 |
| 6,174,091 B1 * | 1/2001 | Herrmann | 385/81 |
| 6,913,392 B2 * | 7/2005 | Grzegorzewska et al. | 385/60 |
| 2004/0071407 A1 | 4/2004 | Vergeest | 385/58 |

FOREIGN PATENT DOCUMENTS

| | | |
|---|---|---|
| GB | 1 447 469 | 8/1976 |
| JP | 50-133847 | 10/1975 |
| JP | 7-270646 | 10/1995 |
| JP | 9-61655 A | 3/1997 |
| JP | 9-159860 | 6/1997 |
| JP | 11-72641 A | 3/1999 |
| JP | 2000-298227 | 10/2002 |

OTHER PUBLICATIONS

US Office Action issued in U.S. Appl. No. 11/404,094 dated on Jun. 12, 2008.

Japanese Office Action, with English Translation, issued in Japanese Patent Application No. JP 2003-358435, dated Jun. 17, 2008.

* cited by examiner

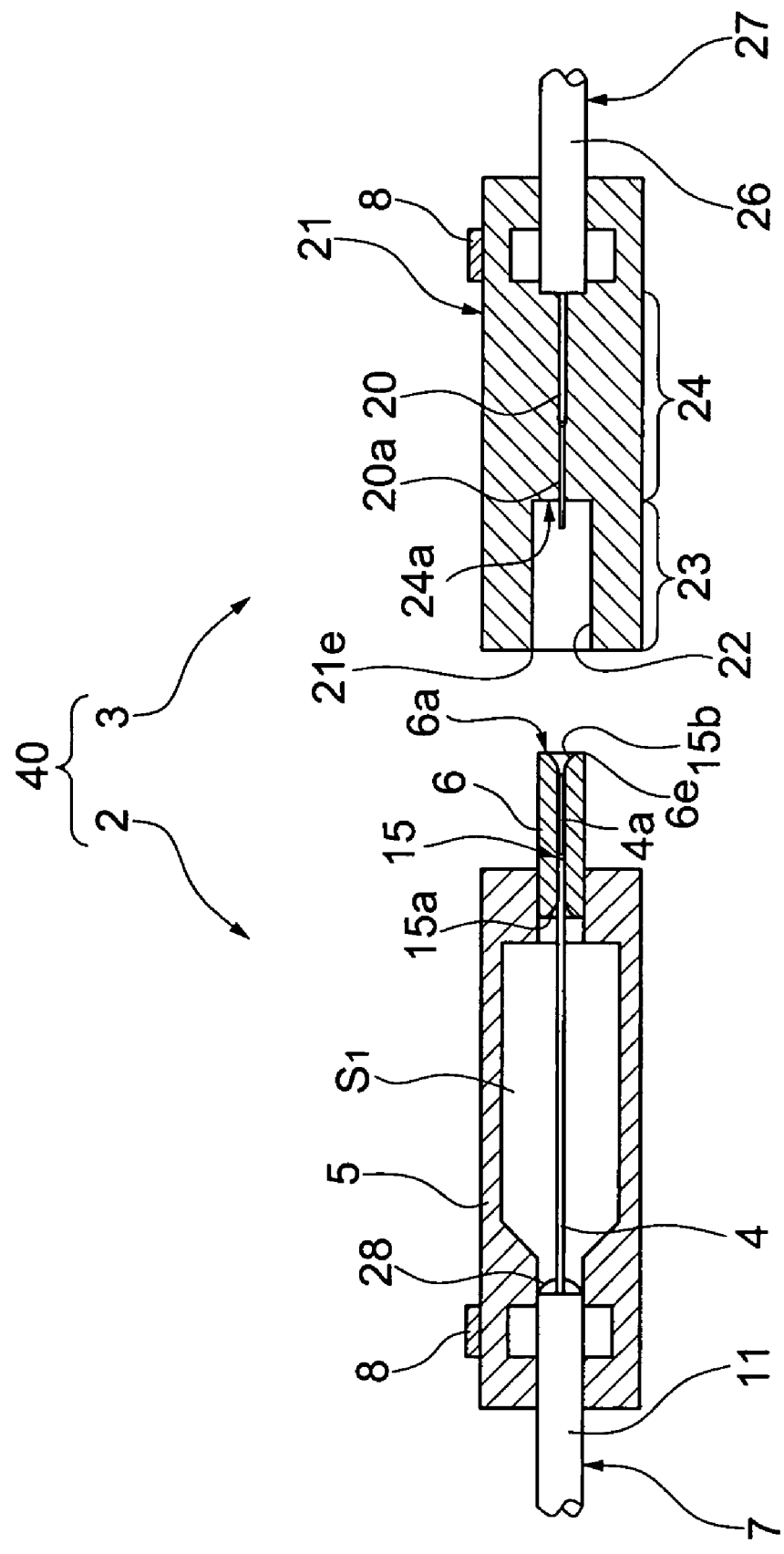

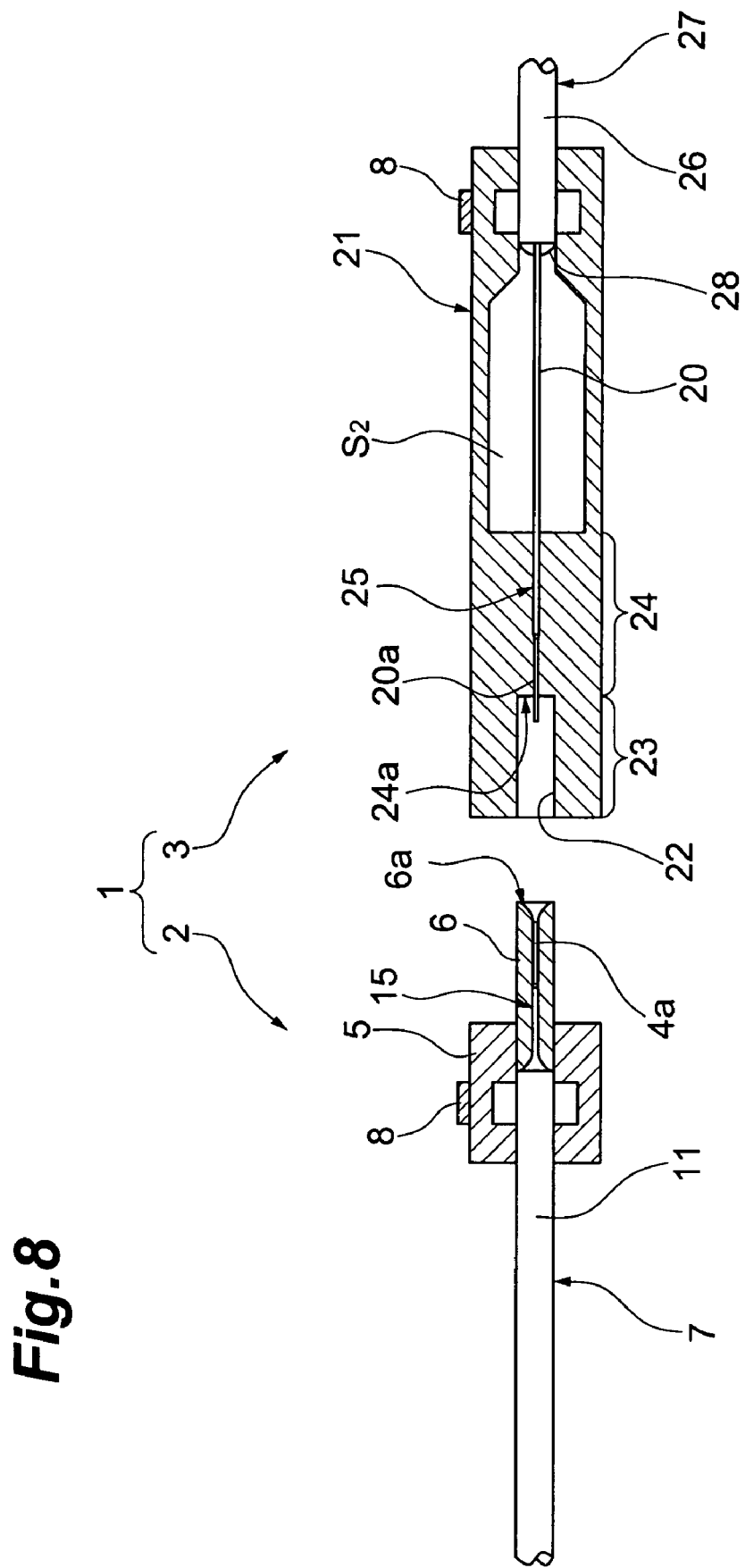

OPTICAL FIBER CONNECTOR, OPTICAL FIBER CONNECTING METHOD, AND CONNECTOR CONVERTER

CROSS-REFERENCE TO RELATED APPLICATION

This application claims priority to Provisional Application Ser. No. 60/791,200 filed on Apr. 12, 2006 by the same Applicant, which is hereby incorporated by reference in its entirety.

BACKGROUND OF THE INVENTION

1. Field of the Invention

The present invention relates to an optical fiber connector, an optical fiber connecting method, and a connector converter, which are used for connecting optical fibers together.

2. Related Background Art

Background Art

One optical fiber connecting method used at maintenance work sites and the like is connection with a connector. For example, an SC connector enables high-precision (low-loss) connection, but has many components and is thus expensive. On the other hand, as a low-cost fiber connecting member, there is a mechanical splicer. As such prior art, for example as described in Japanese Patent Application Laid-open No. 9-61655, there is known a mechanical splicer having a base and a cover that constitute a structure divided into two, and a C-type spring that has the base and the cover inserted therein and applies a pressing force that presses the two together.

SUMMARY OF THE INVENTION

The inventors have studied the prior art in detail, and as a result, have found problems as follows. That is, a mechanical splicer as in the prior art described above does not have an attachable/detachable structure, and hence has the problem of being difficult to use.

In order to overcome the above-mentioned problems, it is an object of the present invention to provide a low-cost attachable/detachable optical fiber connector, an optical fiber connecting method, and a connector converter.

The present invention relates to an optical connector for connecting a first optical fiber and a second optical fiber by abutting these optical fibers each other. The optical connector according to the present invention comprises a first fiber connecting member holding a first optical fiber, and a second fiber connecting member holding a second optical fiber. The first fiber connecting member has a ferrule, a first housing, and a first fixing member. The ferrule has a first inserting hole through which the first optical fiber is inserted, and that holds the first optical fiber inserted through the first inserting hole in a state slidable in the direction of insertion. The first housing is fixed to the ferrule, and covers part of the first optical fiber inserted through the first inserting hole. The first fixing member fixes the first optical fiber inserted through the first inserting hole to the first housing behind the ferrule so as not to protrude out from a front end face of the ferrule. On the other hand, the second fiber connecting member has a second housing, an optical fiber holding portion, and a second fixing member. The second housing has a ferrule engaging portion that has a recess therein into which part of the ferrule is inserted. The optical fiber holding portion is integrated with the ferrule engaging portion, has a second inserting hole that opens into the recess and through which the second optical fiber is inserted, and holds the second optical fiber inserted through the second inserting hole in a state slidable in the direction of insertion. The second fixing member fixes the second optical fiber inserted through the second inserting hole to the second housing behind the optical fiber holding portion so as to protrude into the recess from a front end face of the optical fiber holding portion.

In the case of abutting and thus connecting the first optical fiber and the second optical fiber together using the optical fiber connector, first, the first optical fiber is inserted through the first inserting hole in the ferrule so as not to protrude out from the front end face of the ferrule, and the second optical fiber is inserted through the second inserting hole in the optical fiber holding portion so as to protrude out from the front end face of the optical fiber holding portion. Next, the first optical fiber is fixed to the first housing by the first fixing member behind the ferrule, and the second optical fiber is fixed to the second housing by the second fixing member behind the optical fiber holding portion. Then, the ferrule is inserted into the recess provided in the second housing, so as to abut tip end faces of the first optical fiber and the second optical fiber together, and the ferrule is engaged in the recess. At this time, because the first optical fiber is held by the ferrule in a state slidable in the direction of insertion and is fixed behind the ferrule, and the second optical fiber is held by the optical fiber holding portion in a state slidable in the direction of insertion and is fixed behind the optical fiber holding portion, the tip portion of each of the optical fibers is pushed back, and each of the first and second optical fibers is given a force in a direction pushing the optical fiber abutted thereto. The first and second optical fibers can thus be connected together stably without separating.

In accordance with the optical fiber connector according to the present invention, the first optical fiber and the second optical fiber can be attachably/detachably connected together. Moreover, there is no need to use an SC connector or the like that has many components, and hence the cost can be reduced.

Preferably, edges where the first inserting hole opens out are beveled. As a result, the first and second optical fibers can be inserted into the first inserting hole smoothly.

In addition, preferably, at least one of an edge of an end face of the ferrule on the side inserted into the recess, and an edge where the recess opens out is beveled. As a result, the ferrule can be inserted into the recess smoothly.

The first housing preferably has, between the ferrule and the first fixing member, a space for allowing the first optical fiber to flex in a state in which the first optical fiber has been fixed to the first housing by the first fixing member. As a result, upon being abutted against the second optical fiber, the first optical fiber is flexed and thus sprung, and hence the first optical fiber can be given a force in a direction pushing the second optical fiber.

In addition, the second housing preferably has, between the optical fiber holding portion and the second fixing member, a space for allowing the second optical fiber to flex in a state in which the second optical fiber has been fixed to the second housing by the second fixing member. As a result, upon being abutted against the first optical fiber, the second optical fiber is flexed and thus sprung, and hence the second optical fiber can be given a force in a direction pushing the first optical fiber.

Preferably, the first and the second fixing members fix first and second optical fiber cables which comprise the first and second optical fibers covered by an outer covering material. As a result, the first and second optical fibers can be fixed in the first and second housings stably.

In this case, each of the first and second optical fibers may be bonded to the outer covering material. As a result, the first and second optical fibers can be abutted together so that each optical fiber is stably given a force in a direction pushing the other optical fiber.

The first housing may be provided with stopping means for stopping against the second housing. As a result, the force given to each of the first and second optical fibers in the direction pushing the optical fiber abutted thereto can be held.

The first housing may have a structure that is joinable to the second housing by screwing. As a result, the force given to each of the first and second optical fibers in the direction pushing the optical fiber abutted thereto can be held.

An optical fiber connector according to the present invention comprises a first optical fiber, a second optical fiber, a first fiber connecting member holding the first optical fiber, and a second fiber connecting member holding the second optical fiber. In the optical fiber holder, the first fiber connecting member has a ferrule, a first housing, and a first fixing member. The ferrule has a first inserting hole through which the first optical fiber is inserted, and holds the first optical fiber inserted through the first inserting hole in a state slidable in the direction of insertion. The first housing is fixed to the ferrule, and covers part of the first optical fiber inserted through the first inserting hole. The first fixing member fixes the first optical fiber inserted through the first inserting hole to the first housing behind the ferrule so as not to protrude out from a front end face of the ferrule. On the other hand, the second fiber connecting member has a second housing, an optical fiber holding portion, and a second fixing member. The second housing has a ferrule engaging portion that has a recess therein into which part of the ferrule is inserted. The optical fiber holding portion is integrated with the ferrule engaging portion, has a second inserting hole that opens into the recess and through which the second optical fiber is inserted, and holds the second optical fiber inserted through the second inserting hole in a state slidable in the direction of insertion. The second fixing member fixes the second optical fiber inserted through the second inserting hole to the second housing behind the optical fiber holding portion so as to protrude into the recess from a front end face of the optical fiber holding portion.

In accordance with the optical fiber connector according to the present invention, because the first optical fiber is held by the ferrule in a state slidable in the direction of insertion and is fixed behind the ferrule, and the second optical fiber is held by the optical fiber holding portion in a state slidable in the direction of insertion and is fixed behind the optical fiber holding portion, when the first optical fiber and the second optical fiber are abutted and thus connected together, the tip portion of each of the optical fibers is pushed back, and each of the first and second optical fibers is given a force in a direction pushing the optical fiber abutted thereto. The first and second optical fibers can thus be connected together stably. Moreover, the first optical fiber and the second optical fiber can be attachably/detachably connected together. Furthermore, there is no need to use an SC connector or the like that has many components, and hence the cost can be reduced.

In this case, the length of a tip portion of the second optical fiber protruding into the recess from the front end face of the optical fiber holding portion is preferably not more than 5 mm. As a result, the precision and ease of working when abutting the tip end faces of the first optical fiber and the second optical fiber together can be improved.

An optical fiber connecting method according to the present invention comprises a first to third steps. The first step prepares an optical fiber connector as described above, inserts the first optical fiber through the first inserting hole so as not to protrude out from the front end face of the ferrule, and inserts the second optical fiber through the second inserting hole so as to protrude out from the front end face of the optical fiber holding portion of the second housing. The second step fixes the first optical fiber to the first housing by the first fixing member behind the ferrule, and fixes the second optical fiber to the second housing by the second fixing member behind the second optical fiber holding portion. The third step inserts the ferrule into the recess, so as to abut tip end faces of the first optical fiber and the second optical fiber together.

By connecting the first optical fiber and the second optical fiber together in this way, the first fiber connecting member holding the first optical fiber and the second fiber connecting member holding the second optical fiber can be assembled together attachably/detachably. Moreover, there is no need to use an SC connector or the like that has many components, and hence the cost can be reduced.

Preferably, the tip end faces of the first optical fiber and the second optical fiber are abutted together via a refractive index matching agent. As a result, connection loss due to Fresnel reflection can be reduced.

A connector converter according to the present invention is for optically connecting a first optical fiber and a second optical fiber, and can be attached to a connector that has a connector ferrule holding the first optical fiber. The connector converter according to the present invention comprises a sleeve for optical fiber centering, a converting ferrule, and a housing. A connector ferrule is inserted into one side of the sleeve. The converting ferrule is inserted into the other side of the sleeve, and is provided therein with a third optical fiber that is abutted against and thus connected to the first optical fiber and the second optical fiber. The housing is fixed with the converting ferrule, and covers part of the connector in a state in which the connector ferrule has been inserted into the sleeve. In particular, a tip portion of the converting ferrule protrudes out from an end face on the second optical fiber side of the housing.

In accordance with the connector converter according to the present invention, the connector ferrule of a connector such as an SC connector is inserted into the sleeve, and the converting ferrule is inserted into the recess of the second fiber connecting member of the optical fiber connector, whereby the first optical fiber held by the connector and the second optical fiber held by the second fiber connecting member can be attachably/detachably optically coupled together. As a result, inspection of the second fiber connecting member can be carried out using an ordinary connector. Moreover, as described above, the connector converter according to the present invention is constituted from a relatively low number of components, and hence the cost can be reduced.

Furthermore, a connector converter according to the present invention can be attached to a connector that has a connector ferrule holding a first optical fiber so as to optically couple the first optical fiber and a second optical fiber together. A connector converter according to the present invention comprises a sleeve for optical fiber centering, a converting ferrule, and a housing. The connector ferrule is inserted into one side of the sleeve. The converting ferrule is inserted into the other side of the sleeve, and is provided therein with a third optical fiber that is abutted against and thus connected to the first optical fiber and the second optical fiber. The housing is fixed with the converting ferrule, and covers part of the connector in a state in which the connector ferrule has been inserted into the sleeve. In particular, the converting ferrule is embedded inside the housing such that a recess is formed in an end face on the second optical fiber side of the housing.

In accordance with the connector converter according to the present invention, the connector ferrule of a connector such as an SC connector is inserted into the sleeve, and the ferrule of the first fiber connecting member of the optical fiber connector is inserted into the recess formed in the end face on the second optical fiber side of the housing, whereby the first optical fiber held by the connector and the first optical fiber held by the first fiber connecting member can be attachably/detachably optically coupled together. As a result, inspection of the first fiber connecting member can be carried out using an ordinary connector. Moreover, as described above, the connector converter according to the present invention is constituted from a relatively low number of components, and hence the cost can be reduced.

The present invention will be more fully understood from the detailed description given hereinbelow and the accompanying drawings, which are given by way of illustration only and are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will be apparent to those skilled in the art from this detailed description.

BRIEF DESCRIPTION OF THE DRAWINGS

FIG. 7 is a cross-sectional view showing, as a second application of the optical fiber connector shown in FIG. 1,;

FIG. 8 is a cross-sectional view showing a third application of the optical fiber connector shown in FIG. 1;

DETAILED DESCRIPTION OF THE PREFERRED EMBODIMENTS

In the following, embodiments of an optical fiber connector, an optical fiber connecting method, and a connector converter according to the present invention will be explained in detail with reference to FIGS. 1, 2A, 2B, 3-5, 6A, 6B, and 7-12. In the explanation of the drawings, constituents identical to each other will be referred to with numerals identical to each other without repeating their overlapping descriptions.

Figure 1:
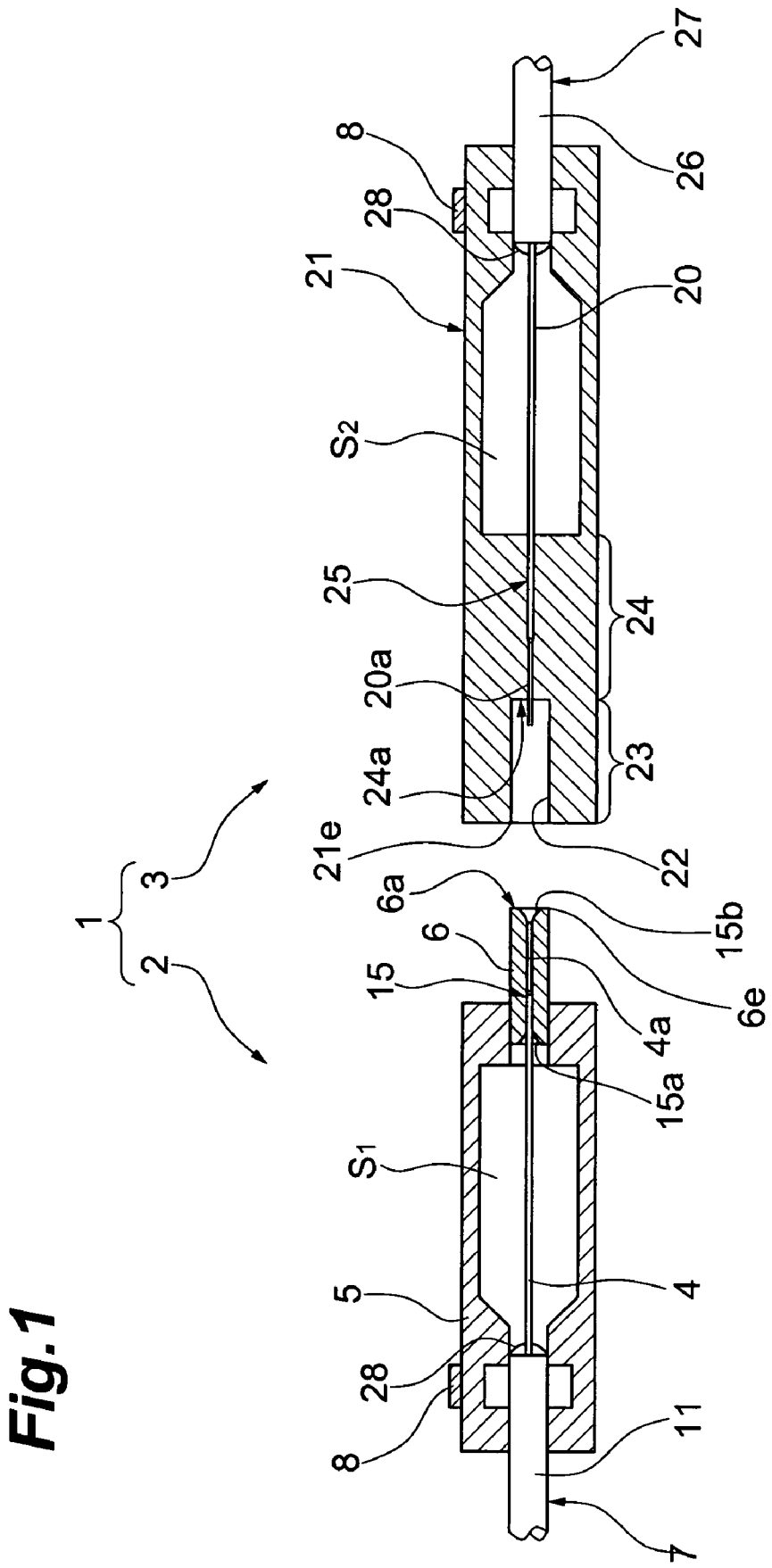
FIG. 1 is a cross-sectional view showing one embodiment of an optical fiber connector according to the present invention.
Figure 2A:
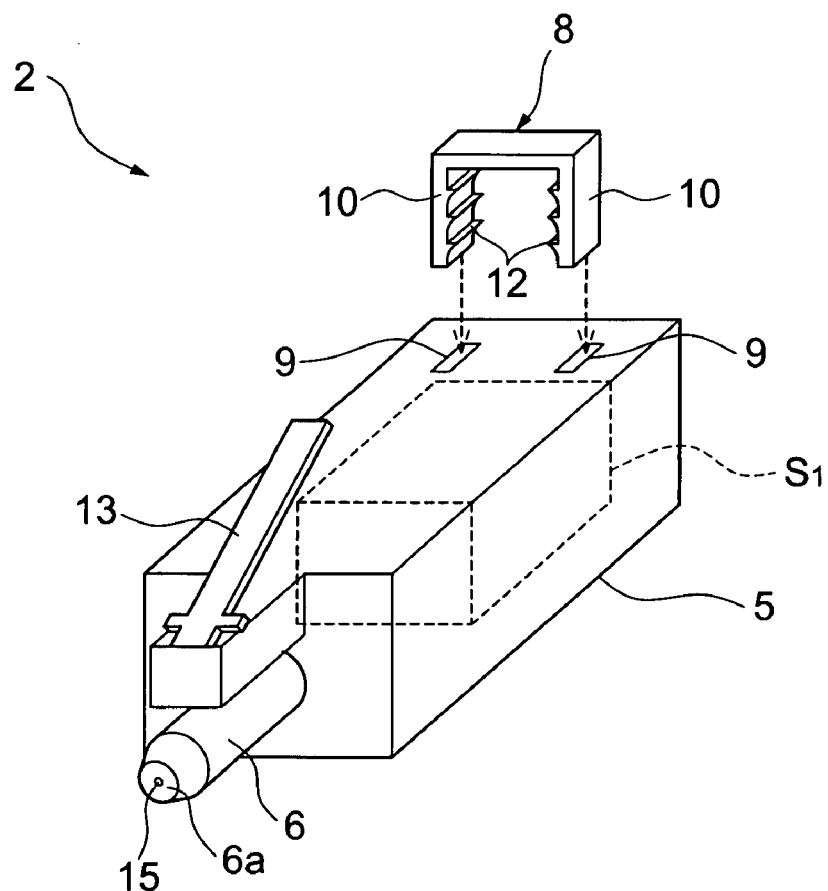
FIGS. 2A and 2B are exploded perspective views showing fiber connecting members constituting the optical fiber connector shown in FIG. 1.

FIG. 1 is a cross-sectional view showing one embodiment of an optical fiber connector according to the present invention, and FIG. 2 is an exploded perspective view showing fiber connecting members constituting the optical fiber connector shown in FIG. 1. In FIG. 1, the optical fiber connector 1 comprises a fiber connecting member 2 shown in FIG. 2A that holds an optical fiber 4, and a fiber connecting member 3 shown in FIG. 2 that is joined to the fiber connecting member 2 and that holds an optical fiber 20.

The fiber connecting member 2 has a housing 5 that has a substantially rectangular parallelepiped shape and that protects the optical fiber 4, a ferrule 6 that is fixed inside the housing 5 and that holds the optical fiber 4, and a fixing member 8 for fixing the optical fiber 4 to the housing 5.

The housing 5 covers and thus protects part of the optical fiber 4 in a state held in the ferrule 6. Two fixing holes 9 into which the fixing member 8 is inserted are formed in an upper surface of the housing 5. The fixing member 8 fixes an optical fiber cable 7, which comprises the optical fiber 4 covered by an outer covering material 11, to the housing 5, thus essentially fixing the optical fiber 4 to the housing 5. The fixing member 8 has a pair of legs 10 that are inserted respectively into the fixing holes 9, rasp-cut wedges (teeth) 12 for digging into the outer covering material 11 of the optical fiber cable 7 being provided on an inner surface of each leg 10.

The housing 5 has therein, between the ferrule 6 and the fixing member 8, a space $S_1$ for allowing the optical fiber 4 to flex.

Figure 2B:
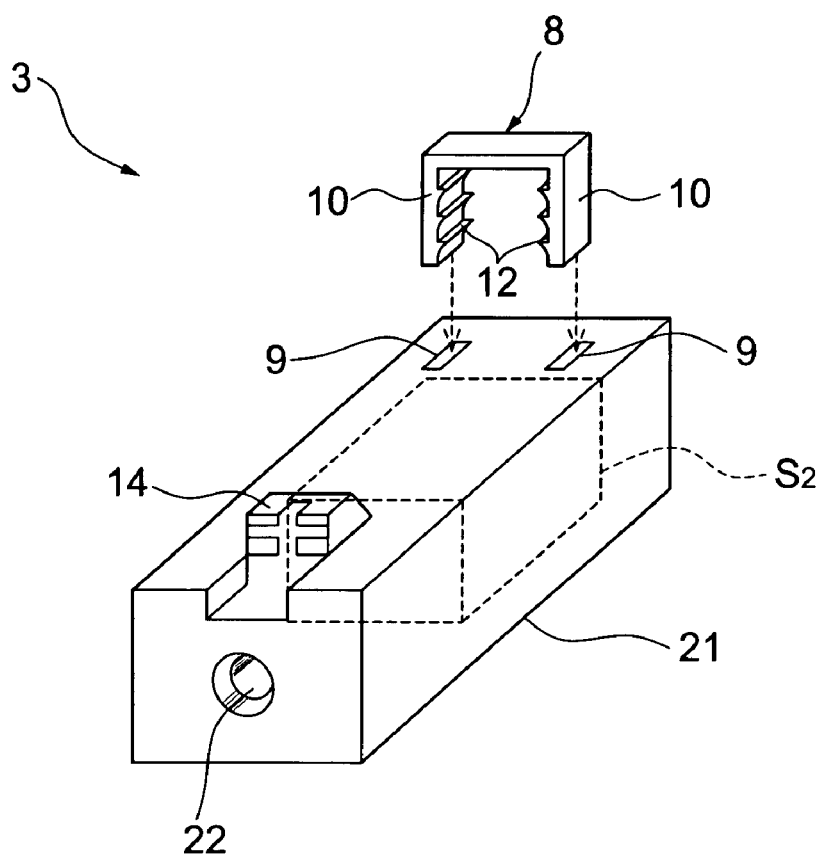

Furthermore, on the housing 5, there is provided either a stopping portion 13 for joining the fiber connecting member 2 and the fiber connecting member 3 together when the optical fiber 4 is connected to the optical fiber 20 connected thereto, or a stopping receiving portion 14 that is stopped by the stopping portion 13. As shown in FIGS. 2A and 2B, the stopping portion 13 is provided on the fiber connecting member 2, and the stopping receiving portion 14 is provided on the fiber connecting member 3. The fiber connecting members 2, 3 are joined together by stopping the stopping portion 13 against the stopping receiving portion 14. Note that in FIG. 1, the stopping portion 13 and the stopping receiving portion 14 are omitted from the drawing.

The ferrule 6 has a substantially circular cylindrical shape, and has therein an inserting hole 15 that is formed in the center thereof along an axial direction and has the optical fiber 4 inserted therethrough. The inserting hole 15 is formed such that the diameter on the side from which the optical fiber 4 is inserted is slightly larger than the optical fiber 4, and the diameter on the side of the tip of the optical fiber 4 is slightly smaller than the middle part of the optical fiber 4 but slightly larger than a bare fiber 4a obtained by stripping off the coating on the cladding of the optical fiber 4. The optical fiber 4 inserted through the inserting hole 15 is held so as to be slidable in the direction of insertion. Also, edges 15a, 15b where the inserting hole 15 opens out are beveled so that the optical fiber 4 can be inserted smoothly into the inserting hole 15. The diameter of the bare fiber 4a is, for example, approximately 0.125 mm, and the diameter of the optical fiber 4 obtained by providing the surface of the bare fiber 4a with a resin is approximately 0.25 mm.

The fiber connecting member 3 has a housing 21 that has a substantially rectangular parallelepiped shape and that t protects the optical fiber 20, and a fixing member 8 for fixing the optical fiber 20 to the housing 21.

The housing 21 covers and thus protects part of the optical fiber 20 in a state held in an optical fiber holding portion 24, described below. Two fixing holes 9 into which is inserted the fixing member 8, which is for fixing to the housing 21 an optical fiber cable 27 comprising the optical fiber 20 covered by an outer covering material 26, are formed in an upper surface of the housing 21.

The housing 21 has a ferrule engaging portion 23 having a recess 22 therein that opens out on the side connected to the fiber connecting member 2, and the optical fiber holding portion 24 which is integrated with the ferrule engaging portion 23.

The recess 22 of the ferrule engaging portion 23 is such that part of the ferrule 6 of the fiber connecting member 2 can be inserted and engaged therein. At least one of an edge 6e of an end face of the ferrule 6 on the recess 22 side and an edge 21e where the recess 22 opens out is preferably beveled so that the ferrule 6 can be inserted smoothly into the recess 22.

The optical fiber holding portion 24 has an inserting hole 25 therein that opens into the recess 22 and through which the optical fiber 20 is inserted. The inserting hole 25 is formed such that the diameter on the side from which the optical fiber 20 is inserted is slightly larger than the optical fiber 20, and the diameter on the side of the tip of the optical fiber 20 is slightly smaller than the optical fiber 20 but slightly larger than a bare fiber 20a obtained by stripping off the coating on the cladding of the optical fiber 20. The optical fiber 20 inserted through the inserting hole 25 is held so as to be slidable in the direction of insertion. As for the bare fiber 4a, the diameter of the bare fiber 20a is, for example, approximately 0.125 mm, and the diameter of the optical fiber 20 obtained by providing the surface of the bare fiber 20a with a coating is approximately 0.25 mm.

The housing 21 has therein, between the optical fiber holding portion 24 and the fixing member 8, a space $S_2$ for allowing the optical fiber 20 to flex.

Next, an optical fiber connecting method using the optical fiber connector 1 comprising the fiber connecting members 2, 3 described above will be explained with reference to FIGS. 3 to 5.

Figure 3:
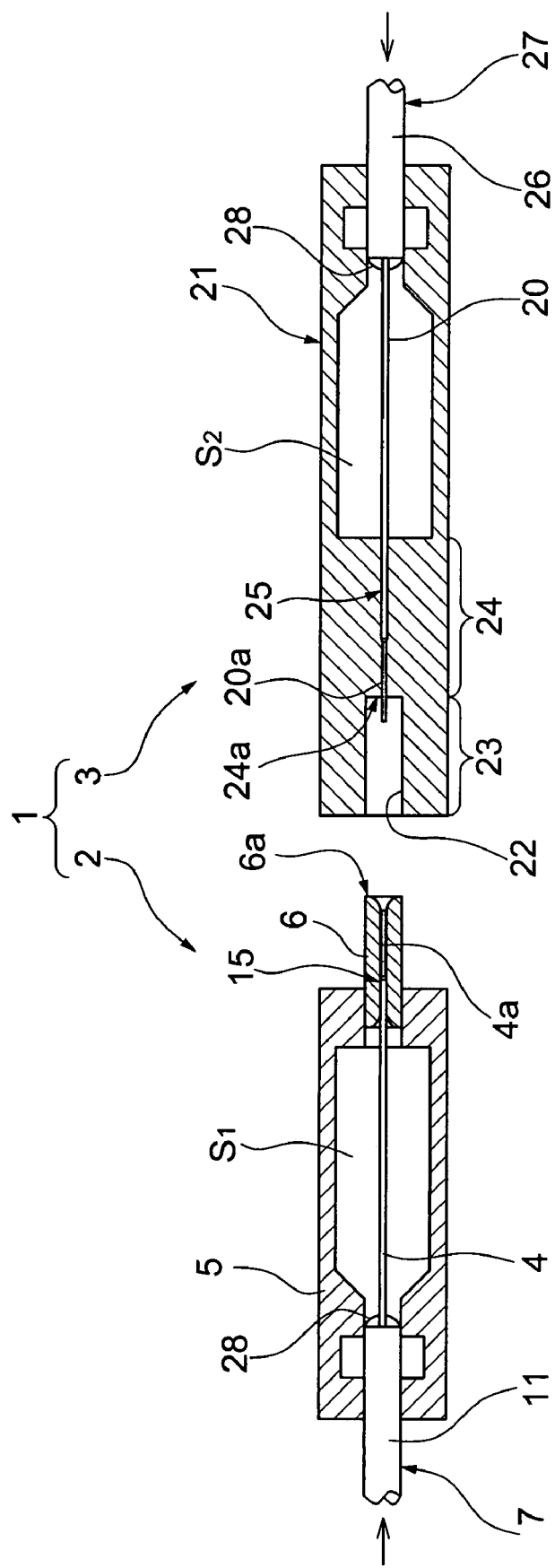
FIG. 3 is a view showing an optical fiber connecting method using the optical fiber connector shown in FIG. 1 (Part 1)

First, as shown in FIG. 3, the optical fiber cable 7 is inserted into the housing 5 of the fiber connecting member 2, and the optical fiber 4 from which the outer covering material 11 has been stripped off is inserted through the inserting hole 15 of the ferrule 6. At this time, a tip portion of the optical fiber 4 is made into a bare fiber 4a as described above, and the optical fiber 4 is inserted through the inserting hole 15 so as not to protrude out from a front end face 6a of the ferrule 6. In addition, a tip end face of the optical fiber 4 becomes a cleavage end face by cutting the bare fiber 4a whose surface is scratched.

Similarly, in the fiber connecting member 3, the optical fiber cable 27 is inserted into the housing 21, and the optical fiber 20 from which the outer covering material 26 has been stripped off is inserted through the inserting hole 25 of the optical fiber holding portion 24. At this time, a tip portion of the optical fiber 20 is made into a bare fiber 20a as described above, and the optical fiber 20 is inserted through the inserting hole 25 so as to protrude into the recess 22 from a front end face 24a of the optical fiber holding portion 24. Considering the precision of and ease of working for abutting the optical fibers 4, 20 together, the length of the protruding portion is preferably made to be not more than 5 mm. Furthermore, in similar to the tip end face of the optical fiber 4, a tip end face of the optical fiber 20 becomes a cleavage end face by cutting the bare fiber 20a whose surface is scratched.

Figure 4:
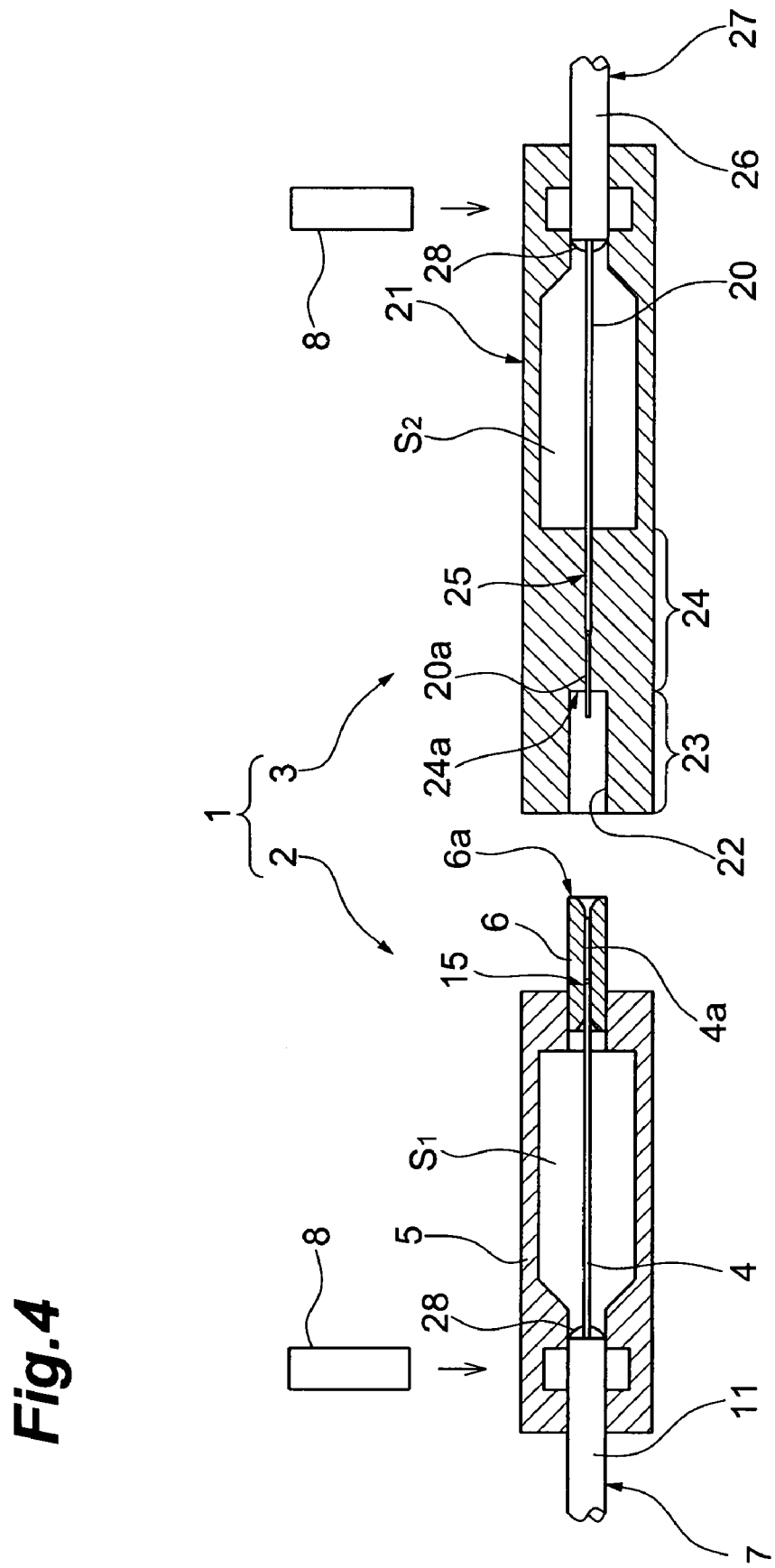
FIG. 4 is a view showing the optical fiber connecting method using the optical fiber connector shown in FIG. 1 (Part 2)

Next, as shown in FIG. 4, the fixing member 8 is inserted into the housing 5 from the upper surface of the housing 5, thus fixing the optical fiber cable 7 to the housing 5 behind the ferrule 6. The fixing member 8 is inserted into the housing 21 from the upper surface of the housing 21, thus fixing the optical fiber cable 27 to the housing 21 behind the optical fiber holding portion 24. At this time, because the optical fiber 4 and the outer covering material 11 are bonded together by an adhesive 28 and the optical fiber 20 and the outer covering material 26 are bonded together by the adhesive 28, the optical fibers 4, 20 are essentially fixed to the housings 5, 21 respectively. In this way, the optical fibers 4, 20 are fixed respectively to the housing 5, 21 in the form of the optical fiber cable 7, 27, and thus can be fixed stably.

Figure 5:
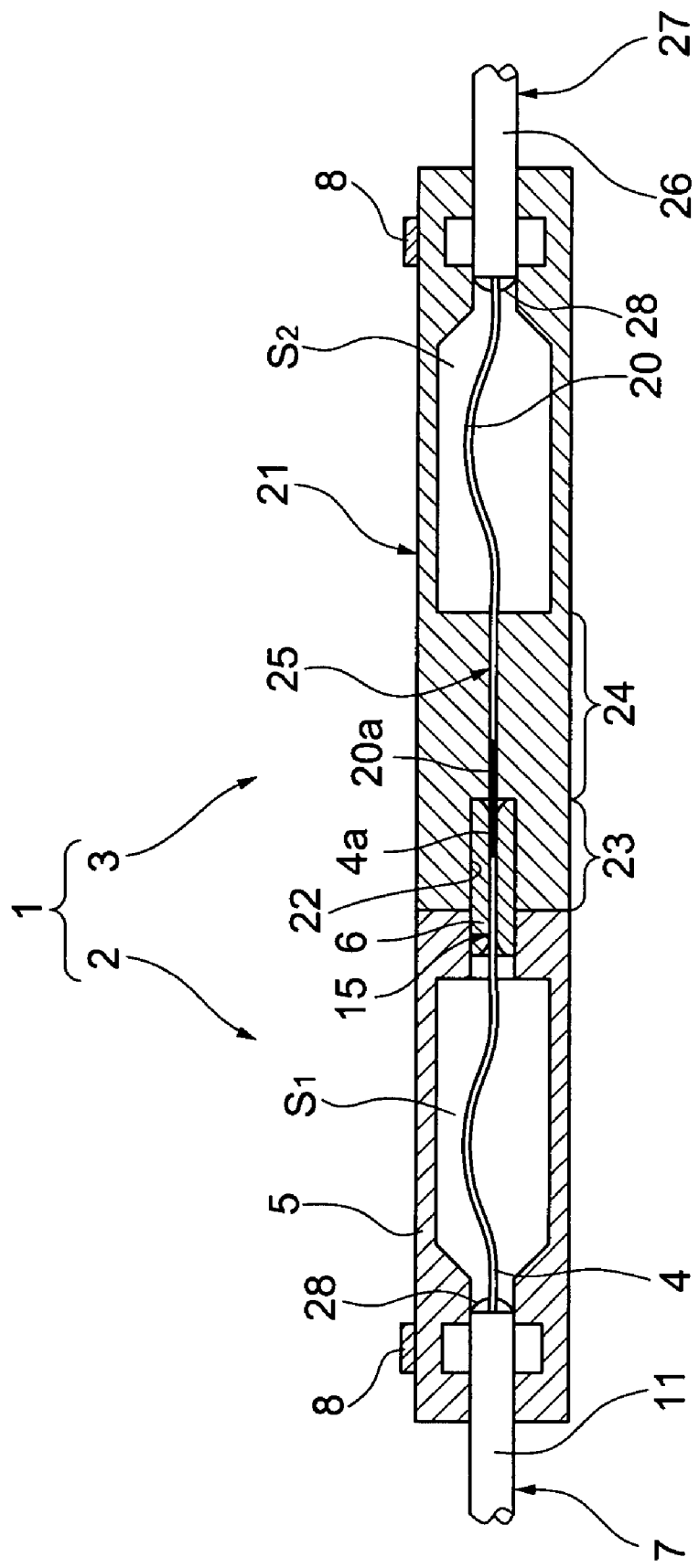
FIG. 5 is a view showing the optical fiber connecting method using the optical fiber connector shown in FIG. 1 (Part 3)

Subsequently, as shown in FIG. 5, the ferrule 6 of the fiber connecting member 2 is inserted into the recess 22 of the fiber connecting member 3, thus abutting the tip end faces of the optical fibers 4, 20 together. At this time, the tip end faces of the optical fibers 4, 20 are preferably abutted together with a refractive index matching agent applied to the abutted tip end faces of the optical fibers 4, 20. As a result, connection loss due to Fresnel reflection can be reduced.

After that, the ferrule 6 is further inserted into the recess 22, thus engaging the ferrule 6 into the recess 22. At this time, the optical fiber 4 slides through the inserting hole 15 while being pushed behind the ferrule 6, and the optical fiber 20 slides through the inserting hole 25 while being pushed behind the optical fiber holding portion 24. As a result, because the optical fiber 4 is fixed to the housing 5 behind the ferrule 6, the optical fiber 4 curves (flexes) in the space $S_1$, and because the optical fiber 20 is fixed to the housing 21 behind the optical fiber holding portion 24, the optical fiber 20 curves (flexes) in the space $S_2$. Each of the optical fibers 4, 20 is thus sprung, a force being applied in a direction so as to push the tip end face of the abutted optical fiber 20 or 4 connected thereto. The optical fibers 4, 20 are thus connected together stably, and hence separation of the optical fibers 4, 20 from one another due to temperature fluctuations or the like can be prevented.

Moreover, by abutting the optical fibers 4, 20 together with strong sprung forces in this way, the tip end faces of the optical fibers 4, 20 no longer need be cut precisely, and furthermore polishing of the tip end faces of the optical fibers 4, 20 becomes unnecessary. The optical fibers 4, 20, obtained by cutting the bare fibers 4a, 20a whose surfaces are scratched, can thus be connected together, and hence the ease of working can be improved.

At this time, as described above, the housings 5, 21 of the fiber connecting members 2, 3 are joined together through the stopping portion 13 and the stopping receiving portion 14, and hence the force pushing the tip end face of each of the optical fibers 4, 20 applied by the optical fiber 20 or 4 connected thereto is held, whereby the optical fibers 4, 20 can be maintained in a stably connected state, and thus connection loss can be reduced.

As described above, in the optical fiber connector 1, the fiber connecting member 2 having the housing 5 and the ferrule 6, and the fiber connecting member 3 having the housing 21 having the recess 22 therein are assembled together, so as to connect the optical fibers 4, 20 together, whereby an attachable/detachable optical fiber connector 1 can be easily be realized.

Furthermore, as compared with an SC connector or the like, the number of components of the optical fiber connector 1 is lower, and hence the cost of the optical fiber connector can be kept down. Also, the optical fibers 4 and optical fiber 20 are installed in the fiber connecting members 2, 3 respectively in advance, and hence at the work site the only work that need be carried out is to insert the ferrule 6 of the fiber connecting member 2 into the recess 22 of the fiber connecting member 3, whereby the ease of working can be greatly improved.

Still further, in accordance with the optical fiber connector 1, in the fiber connecting member 3, the optical fiber 20 is held by the housing 21 itself, the structure being such that a ferrule is not required; as a result, the cost can be reduced accordingly, and moreover the centers of the optical fibers can be aligned precisely without being affected by a ferrule-housing clearance.

Figure 6A:
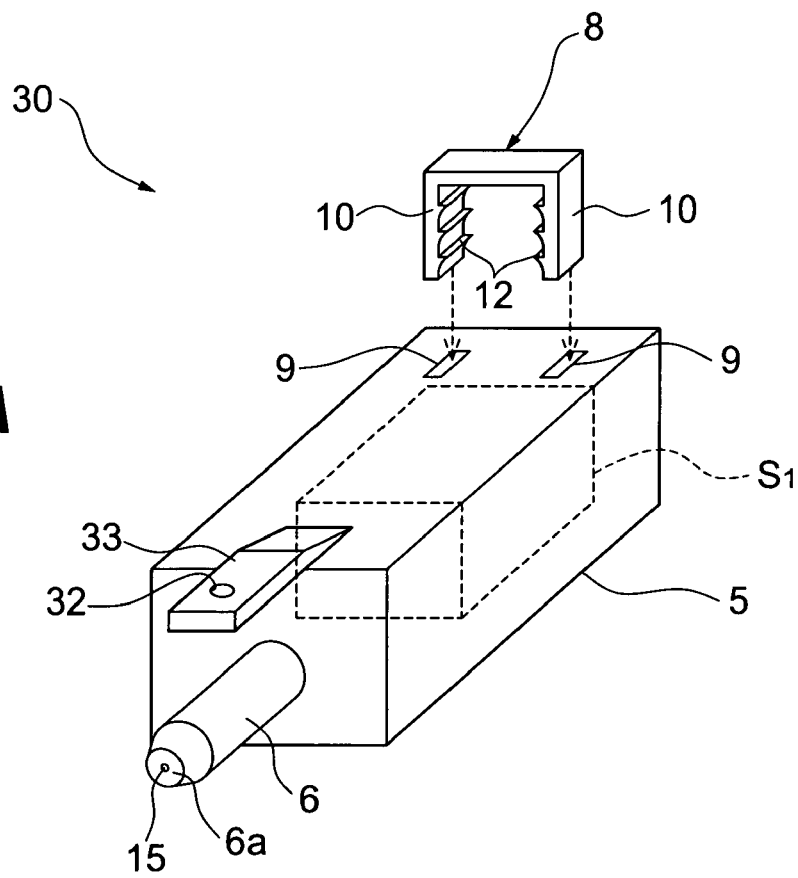
FIGS. 6A and 6B are exploded perspective views showing fiber connecting members constituting a first application of the optical fiber connector shown in FIG. 1.
Figure 6B:
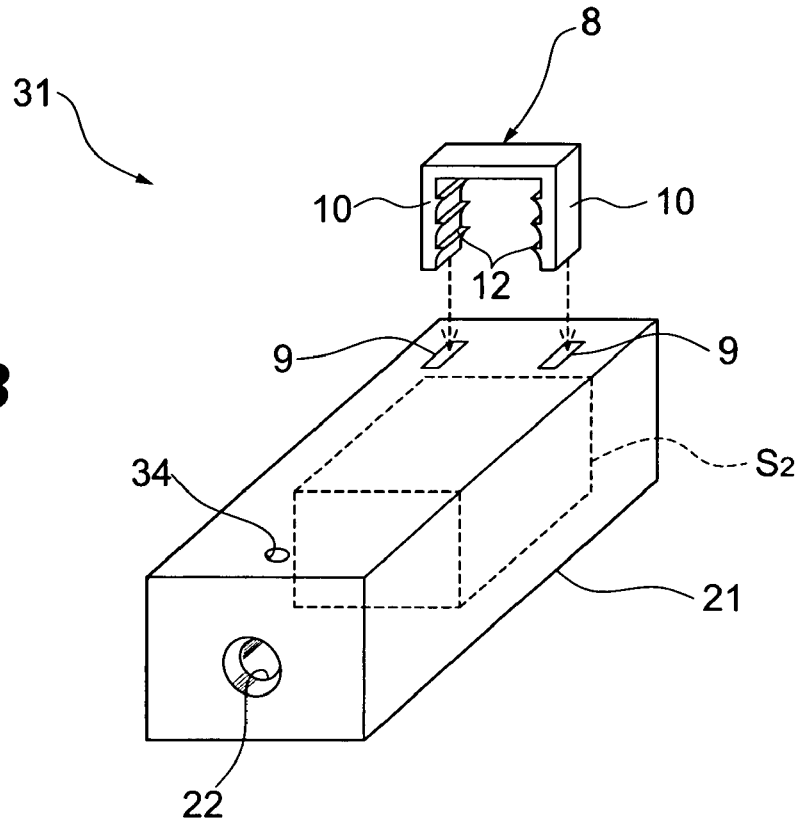

FIGS. 6A and 6B are exploded perspective views showing fiber connecting members constituting a first application of the optical fiber connector shown in FIG. 1. For fiber connecting members 30, 31 shown in FIGS. 6A and 6B, the means for joining the fiber connecting members together when connecting the optical fibers is different to for the fiber connecting members 2, 3.

The housing 5 of the fiber connecting member 30 is provided with a screwing portion 33 in which is provided a hole 32 through which a screw is passed, as shown in FIG. 6A. On the other hand, the housing 21 of the fiber connecting member 31 has provided therein a screwing hole 34 through which the screw is passed together with the hole 32, as shown in FIG. 6B. As a result, the housings 5, 21 can be screwed together so as to keep the fiber connecting members 30, 31 joined together. That is, the force pushing the tip end face of the optical fibers 4 applied by the optical fiber 20 connected thereto is held, and inversely the force pushing the tip end face of the optical fibers 20 applied by the optical fiber 4 connected thereto is held, whereby the optical fibers 4 20 can be maintained in a stably connected state. As a result, connection loss can be reduced.

In the optical fiber connector 1 described above, a mode may be adopted in which one of the fiber connecting members 2, 3 does not have a space for allowing the associated one of the optical fibers 4, 20 to flex provided inside the housing thereof.

FIG. 7 is a cross-sectional view showing, as a second application of the optical fiber connector shown in FIG. 1. In the second application shown in FIG. 7, the space $S_1$ is provided inside the housing 5 of the fiber connecting member 2, but a space is not provided inside the housing 21 of the fiber connecting member 3.

FIG. 8 is a cross-sectional view showing a third application of the optical fiber connector shown in FIG. 1. In the third application shown in FIG. 8, the space $S_2$ is provided inside the housing 21 of the fiber connecting member 3, but a space is not provided inside the housing 5 of the fiber connecting member 2.

By adopting a structure in which a space is not provided inside the housing of one of the fiber connecting members as shown in FIG. 7 or FIG. 8, a corresponding amount of space can be saved, and hence the optical fiber connector 1 can be made smaller.

Next, One embodiment of a connector converter according to the present invention will be explained with reference to FIGS. 9 to 12.

Figure 9:
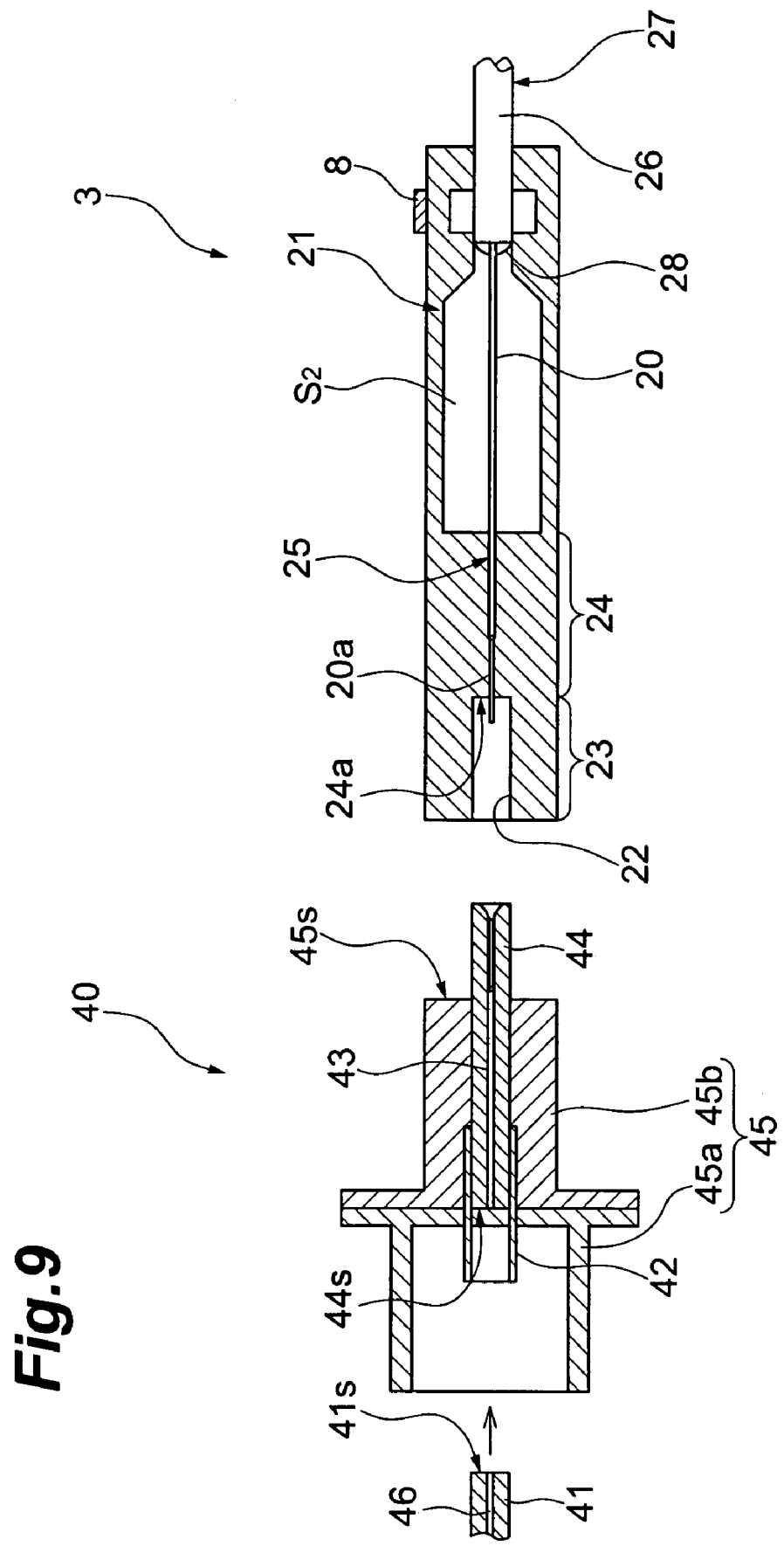
FIG. 9 is a cross-sectional view showing one embodiment of a connector converter according to the present invention, together with a connector ferrule and a fiber connecting member which holds optical fibers to be optically coupled together by the connector converter.

FIG. 9 is a cross-sectional view showing one embodiment of a connector converter according to the present invention, together with a connector ferrule and a fiber connecting member holding optical fibers to be optically coupled together by the connector converter. In FIG. 9, the connector converter 40 enables a connector such as an SC connector and the fiber connecting member 3 described earlier to be assembled together, and comprises a sleeve 42 for optical fiber centering into which is inserted a connector ferrule 41 of the connector, a ferrule 44 that is inserted into the sleeve 42 on the fiber connecting member 3 connection side (the opposite side to the connector ferrule 41) and has an optical fiber 43 provided therein, and a housing 45 that is fixed to the ferrule 44.

The sleeve 42 is fixed to the housing 45 together with the ferrule 44. The connector ferrule 41 is inserted and engaged into the sleeve 42, whereby an optical fiber 46 held by the connector ferrule 41 and the optical fiber 43 provided inside the ferrule 44 are connected together with the centers thereof aligned. A tip portion of the optical fiber 43 on the side that is to be abutted against the optical fiber 20 is bare fiber, and moreover the optical fiber 43 is bonded and thus fixed inside the ferrule 44 in a state with the tip portion not protruding out from an end face of the ferrule 44.

An end face 44s of the ferrule 44 that is to contact an end face 41s of the connector ferrule 41 is polished. As a result, it is not necessary to apply grease or the like onto the end face 41s of the connector ferrule 41 or the end face 44s of the ferrule 44.

The housing 45 has a connector protecting portion 45*a* that covers part of the connector in a state in which the connector ferrule 41 has been inserted into the sleeve 42, and a ferrule protecting portion 45*b* that covers part of the ferrule 44.

Furthermore, a tip portion of the ferrule 44 protrudes out from an end face 45s on the fiber connecting member 3 connection side of the ferrule protecting portion 45*b* of the housing 45, and this protruding portion is inserted and engaged into the recess 22 in the ferrule engaging portion 23 of the fiber connecting member 3.

Figure 10:
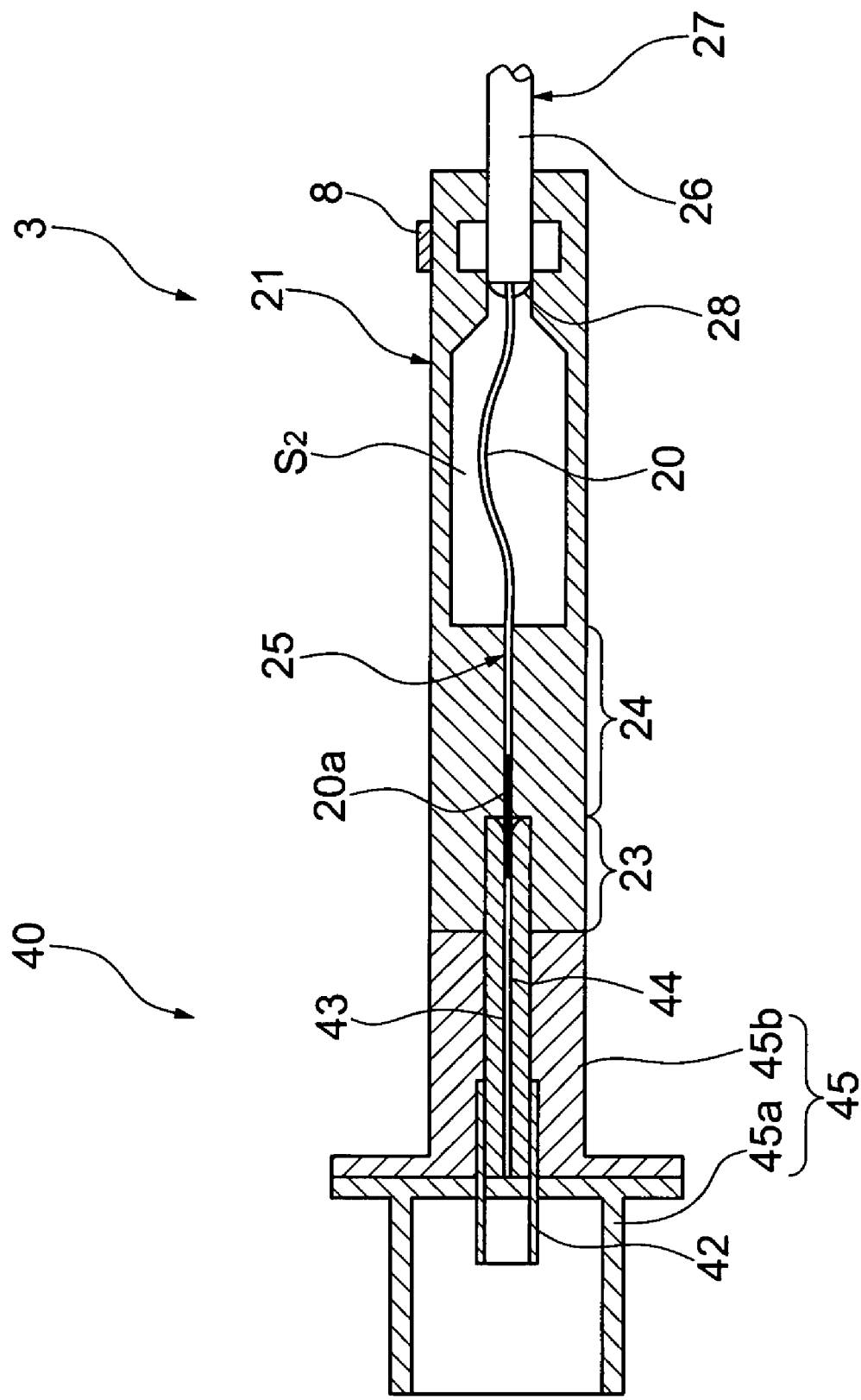
FIG. 10 is a cross-sectional view showing a state in which the connector converter and the fiber connecting member shown in FIG. 9 have been connected together.

In accordance with the connector converter 40, the connector ferrule 41 of a connector such as an SC connector is inserted into the sleeve 42, and the ferrule 44 is inserted into the recess 22 of the fiber connecting member 3 of the optical fiber connector 1, whereby the optical fiber 46 held by the connector ferrule 41 and the optical fiber 20 held by the fiber connecting member 3 can be optically coupled together. The state in which the connector converter 40 and the fiber connecting member 3 have been connected together is shown in FIG. 10. FIG. 10 is a cross-sectional view showing a state in which the connector converter and the fiber connecting member shown in FIG. 9 have been connected together.

By using the connector converter 40 in this way, an ordinary connector such as an SC connector and the fiber connecting member 3 can be attachably/detachably connected together, and hence, for example, inspection of the fiber connecting member 3 can be carried out. Moreover, the connector converter is constituted from a relatively low number of components, and hence the cost can be kept down.

Figure 11:
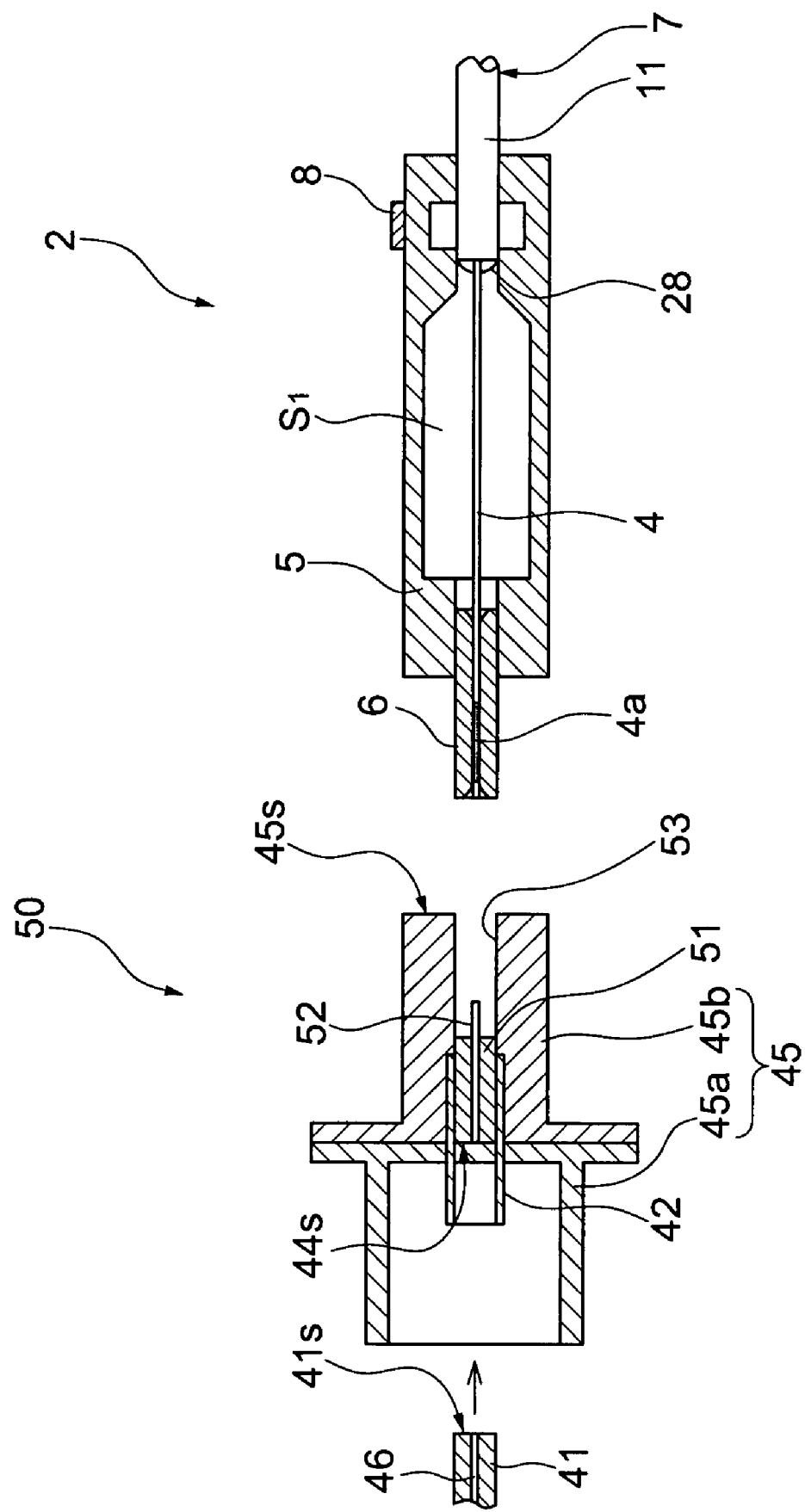
FIG. 11 is a cross-sectional view showing an application the connector converter shown in FIG. 9, together with a connector ferrule and a fiber connecting member which holds optical fibers to be optically coupled together by the connector converter.

FIG. 11 is a cross-sectional view showing an application the connector converter shown in FIG. 9, together with a connector ferrule and a fiber connecting member which holds optical fibers to be optically coupled together by the connector converter. The connector converter 50 shown in FIG. 11 enables a connector such as an SC connector and the fiber connecting member 2 described earlier to be assembled together, and differs to the connector converter 40 shown in FIG. 9 in having a ferrule 51 of a different form to the ferrule 44 of the connector converter 40. The ferrule 51 of the connector converter 50 is provided embedded inside the housing 45 such that a recess 53 is formed in the end face 45s on the optical fiber 4 side (the fiber connecting member 2 connection side) of the housing 45.

The ferrule 6 of the fiber connecting member 2 is inserted and engaged into the recess 53, whereby an optical fiber 52 and the optical fiber 4 are abutted and thus connected together.

Figure 12:
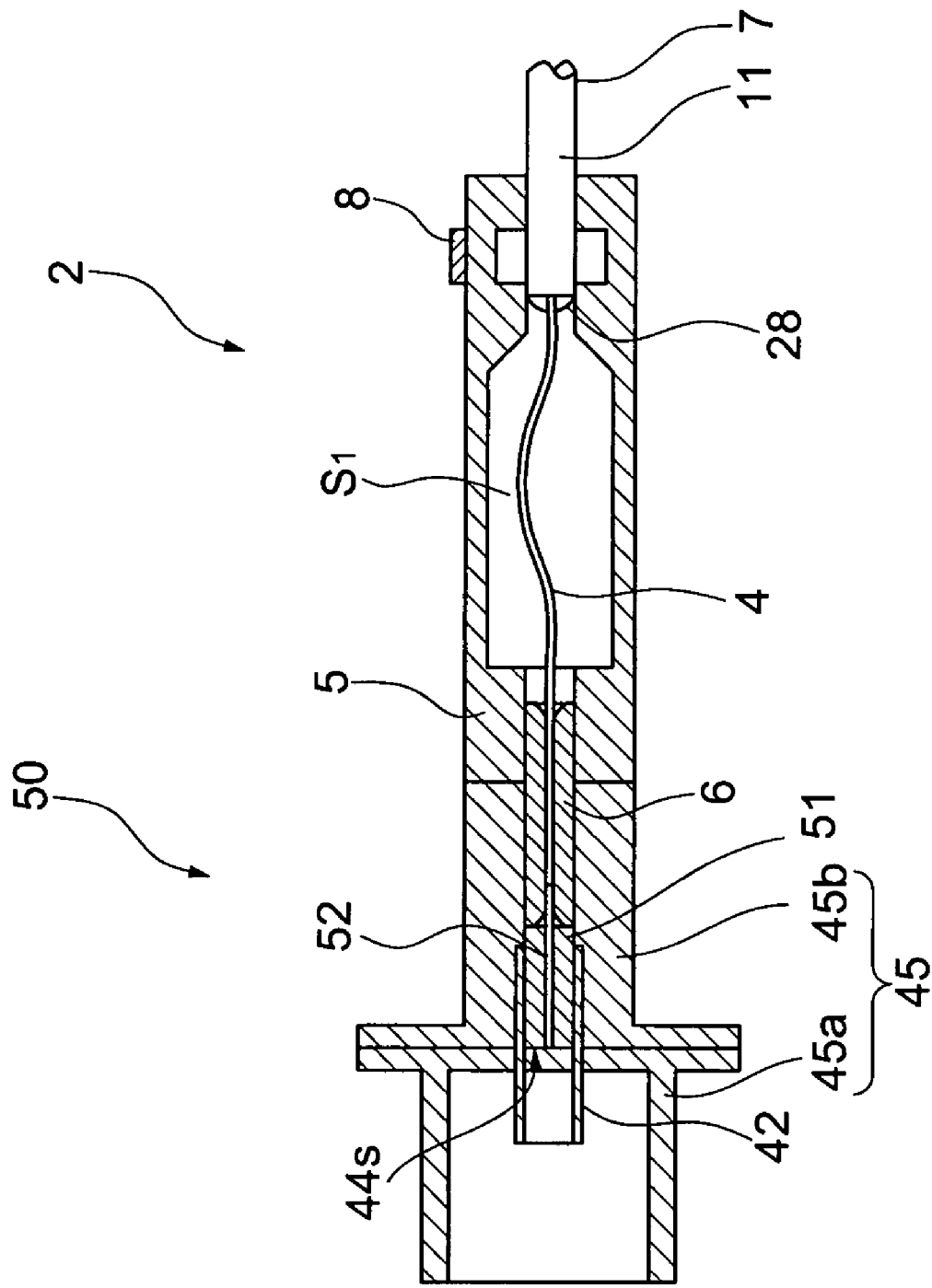
FIG. 12 is a cross-sectional view showing a state in which the connector converter and the fiber connecting member shown in FIG. 11 have been connected together.

In accordance with the connector converter 50, the connector ferrule 41 of a connector such as an SC connector is inserted into the sleeve 42, and the ferrule 6 of the fiber connecting member 2 of the optical fiber connector 1 is inserted into the recess 53 in the housing 45 of the connector converter 50, whereby the optical fiber 46 held by the connector ferrule 41 and the optical fiber 4 held by the fiber connecting member 2 can be optically coupled together. The state in which the connector converter 50 and the fiber connecting member 2 have been connected together is shown in FIG. 12. FIG. 12 is a cross-sectional view showing a state in which the connector converter and the fiber connecting member shown in FIG. 11 have been connected together.

By using the connector converter 50 according to the present embodiment, an ordinary connector such as an SC connector and the fiber connecting member 2 can be attachably/detachably connected together, and hence inspection of the fiber connecting member 2 can be carried out. Moreover, the connector converter is constituted from a relatively low number of components, and hence the cost can be kept down.

Preferable embodiments according to the present invention have been described in detail above, but the present invention is not limited to the above embodiments. For example, in the above embodiments, each fiber connecting member is constituted so as to hold one optical fiber, but each fiber connecting member may instead be constituted so as to hold a plurality of optical fibers.

In accordance with the present invention, there can be provided a low-cost attachable/detachable optical fiber connector, an optical fiber connecting method, and a connector converter.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical fiber connector for connecting a first optical fiber and a second optical fiber by abutting these optical fibers, said optical fiber connector comprising:
    (1) a first fiber connecting member for holding said first optical fiber said first fiber connecting member having:
        a ferrule having a first inserting hole through which said first optical fiber is inserted, thereby holding said first optical fiber inserted through said first inserting hole in a state slidable in the direction of insertion;
        a first housing fixed to said ferrule, and covering part of said first optical fiber inserted through said first inserting hole; and
        a first fixing member for fixing said first optical fiber inserted through said first inserting hole to said first housing behind said ferrule so as not to protrude out from a front end face of said ferrule; and
    (2) a second fiber connecting member for holding said second optical fiber, said second fiber connecting member having:
        a second housing having: a ferrule engaging portion that has a recess therein into which part of said ferrule is inserted; and an optical fiber holding portion that is integrated with said ferrule engaging portion, that has a second inserting hole opening into said recess and through which said second optical fiber is inserted, and that holds said second optical fiber inserted through said second inserting hole in a state slidable in the direction of insertion; and
        a second fixing member for fixing said second optical fiber inserted through said second inserting hole to said second housing behind said optical fiber holding portion so as to protrude into said recess from a front end face of said optical fiber holding portion,
    wherein an opening edge of said first inserting hole in said ferrule is chamfered.

2. An optical fiber connector according to claim 1, wherein at least one of an edge of an end face of said ferrule on the side inserted into said recess and an opening edge of said recess is chamfered.

3. An optical fiber connector according to claim 1, wherein said first housing has, between said ferrule and said first fixing member, a space for allowing said first optical fiber to flex in a state in which said first optical fiber has been fixed to said first housing by said first fixing member.

4. An optical fiber connector according to claim 1, wherein said second housing has, between said optical fiber holding portion and said second fixing member, a space for allowing said second optical fiber to flex in a state in which said second optical fiber has been fixed to said second housing by said second fixing member.

5. An optical fiber connector according to claim 1, wherein said first and said second fixing members fix first and second optical fiber cables which comprise said first and second optical fibers covered by an outer covering material.

6. An optical fiber connector according to claim 5, wherein each of said first and second optical fibers is bonded to said outer covering material.

7. An optical fiber connector according to claim 1, wherein said first housing is provided with stopping means for stopping against said second housing.

8. An optical fiber connector according to claim 1, wherein said first housing has a structure that is jointable to said second housing by screwing.

9. An optical fiber connector comprising:
    (1) a first optical fiber;
    (2) a first fiber connecting member for holding said first optical fiber, said first fiber connecting member having:
        a ferrule having a first inserting hole through which said first optical fiber is inserted, thereby holding said first optical fiber inserted through said first inserting hole in a state slidable in the direction of insertion;
        a first housing fixed to said ferrule, and covering part of said first optical fiber inserted through said first inserting hole; and
        a first fixing member for fixing said first optical fiber inserted through said first inserting hole to said first housing behind said ferrule so as not to protrude out from a front end face of said ferrule;
    (3) a second optical fiber optically connected to said first optical fiber; and
    (4) a second fiber connecting member for holding said second optical fiber, said second fiber connecting member having:
        a second housing having a ferrule engaging portion that has a recess therein into which part of said ferrule is inserted, and an optical fiber holding portion that is integrated with said ferrule engaging portion, that has a second inserting hole opening into said recess and through which said second optical fiber is inserted, and that holds said second optical fiber inserted through said second inserting hole in a state slidable in the direction of insertion; and a second fixing member for fixing said second optical fiber inserted through said second inserting hole to said second housing behind said optical fiber holding portion so as to protrude into said recess from a front end face of said optical fiber holding portion, wherein a tip portion of said second optical fiber, which is protruded from said front end face of said optical fiber holding portion, is inserted in said first inserting hole in said ferrule together with said first optical fiber, in a state of butting said first and second optical fibers.

10. An optical fiber connector according to claim 9, wherein a length of a tip portion of said second optical fiber protruding into said recess from the front end face of said optical fiber holding portion is 5 mm or less.

11. An optical fiber connecting method comprising:
a first step of preparing an optical fiber connector according to claim 1, inserting said first optical fiber through said first inserting hole so as not to protrude out from the front end face of said ferrule, and inserting said second optical fiber through said second inserting hole so as to protrude out from the front end face of said optical fiber holding portion of said second housing;

a second step of fixing said first optical fiber to said first housing by said first fixing member behind said ferrule, and fixing said second optical fiber to said second housing by said second fixing member behind said optical fiber holding portion; and a third step of inserting said ferrule into said recess, so as to abut tip end faces of said first optical fiber and said second optical fiber together.

12. An optical fiber connecting method according to claim 11, wherein the tip end faces of said first optical fiber and said second optical fiber are abutted together through a refractive index matching agent.

13. A connector converter to be attached to a connector having a connector ferrule holding a first optical fiber so as to optically couple said first optical fiber and a second optical fiber together, said connector converter comprising:
a sleeve for optical fiber centering into one side of which is inserted into said connector ferrule;

a converting ferrule inserted into the other side of said sleeve a third optical fiber having a first end optically connected to an end of said first optical fiber and a second end optically connected to an end of said second optical fiber, at least part of said third optical fiber being accommodated in said converting ferrule; and a housing having an inner space accommodating both said sleeve and said converting ferrule, and covering part of said connector in a state in which said connector ferrule has been inserted into said sleeve, wherein a tip portion of said converting ferrule protrudes out from an end face on the second optical fiber side of said housing.

14. A connector converter to be attached to a connector having a connector ferrule holding a first optical fiber so as to optically couple said first optical fiber and a second optical fiber together, said connector converter comprising:
a sleeve for optical fiber centering into one side of which is inserted into said connector ferrule;

a converting ferrule inserted into the other side of said sleeve;

a third optical fiber having a first end optically connected to an end of said first optical fiber and a second end optically connected to an end of said second optical fiber, at least part of said third optical fiber being accommodated in said converting ferrule; and a housing having an inner space accommodating both said sleeve and said converting ferrule, and covering part of said connector in a state in which said connector ferrule has been inserted into said sleeve, wherein said converting ferrule is embedded inside said housing such that a recess is formed in an end face on the second optical fiber side of said housing.

* * * * *